United States Patent [19]

Demario et al.

[11] Patent Number: 4,716,016
[45] Date of Patent: Dec. 29, 1987

[54] UNIVERSAL FUEL ASSEMBLY CONSTRUCTION FOR A NUCLEAR REACTOR

[75] Inventors: Edmund E. Demario, Penn Hills Twp.; Denis L. Burman, Monroeville; Carl A. Olson, Monroeville; Jeffrey R. Secker, Monroeville, all of Pa.

[73] Assignee: Westinghouse Electric Corp., Pittsburgh, Pa.

[21] Appl. No.: 708,190
[22] Filed: Mar. 4, 1985
[51] Int. Cl.$^4$ .............................................. G21C 3/32
[52] U.S. Cl. ................................... 376/446; 376/173; 376/209; 376/267; 376/327; 376/353; 376/435; 376/449
[58] Field of Search ............... 376/446, 434, 449, 438, 376/364, 224, 440, 437, 447, 209, 327, 173, 267, 353, 435

[56] References Cited

U.S. PATENT DOCUMENTS

| | | | |
|---|---|---|---|
| Re 30,065 | 8/1979 | Anthony et al. | 376/ |
| 3,133,867 | 5/1964 | Frisch | 376/438 |
| 3,149,043 | 9/1964 | Goldstein et al. | 376/ |
| 3,361,639 | 1/1968 | Ashcroft et al. | 376/449 |
| 3,375,172 | 3/1968 | Mansson et al. | 376/438 |
| 3,377,254 | 4/1968 | Frisch | 376/446 |
| 3,379,618 | 4/1968 | Frisch | 376/446 |
| 3,389,056 | 6/1968 | Frisch | 176/78 |
| 3,407,115 | 10/1968 | North, Jr. et al. | 376/438 |
| 3,423,287 | 1/1969 | Anthony et al. | 376/ |
| 3,652,394 | 3/1972 | Braun | 376/327 |
| 3,791,466 | 2/1974 | Patterson | 176/78 |
| 3,802,995 | 4/1974 | Fritz et al. | 376/ |
| 3,828,868 | 8/1974 | Jabsen | 176/78 |
| 3,861,999 | 1/1975 | Zmola et al. | 376/ |
| 3,954,560 | 5/1976 | Delafosse et al. | 376/446 |
| 3,968,008 | 7/1976 | Piepers et al. | 376/ |
| 4,030,975 | 6/1977 | Anthony et al. | 376/ |
| 4,038,137 | 7/1977 | Pugh | 376/446 |
| 4,059,484 | 11/1977 | Bupp et al. | 176/78 |
| 4,155,808 | 5/1979 | Jabsen | 376/245 |
| 4,302,294 | 11/1981 | Leclercq | 376/ |
| 4,304,631 | 12/1981 | Walton et al. | 376/364 |
| 4,348,355 | 9/1982 | Nylund | 376/434 |
| 4,420,457 | 12/1983 | LePargneux | 376/446 |
| 4,432,934 | 11/1984 | Gjertson et al. | 376/333 |
| 4,481,164 | 11/1984 | Bollinger | 376/233 |
| 4,534,933 | 8/1985 | Gjertsen et al. | 376/364 |

FOREIGN PATENT DOCUMENTS

| | | | |
|---|---|---|---|
| 0049667 | 4/1982 | European Pat. Off. | |
| 2445984 | 1/1976 | Fed. Rep. of Germany | 376/446 |
| 3247544 | 7/1983 | Fed. Rep. of Germany | 376/327 |
| 0040293 | 3/1977 | Japan | 376/440 |
| 0022633 | 10/1978 | Japan | 376/327 |
| 1148881 | 4/1969 | United Kingdom | |
| 1228610 | 4/1971 | United Kingdom | 376/446 |

OTHER PUBLICATIONS

The Sequoyah reactors—fuel and fuel components, Heil, Nuclear Engr. Int., 10/71.
Fabrication Development and Application of an Annular $Al_2O_3$-$B_4C$, Burnable Absorber, Radford et al., Nuclear Technology, 3/83.

Primary Examiner—Deborah L. Kyle
Assistant Examiner—Daniel Wasil

[57] ABSTRACT

The universal fuel assembly has a plurality of elongated corner posts extending longitudinally between and releasably and rigidly interconnecting top and bottom nozzles so as to form a rigid structural skeleton of the fuel assembly. Additionally, a plurality of transverse grids are supported at axially spaced locations along the corner posts and a plurality of fuel rods are supported by the grids. Certain groups of the fuel rods are spaced apart laterally from one another by a greater distance than the rest of the fuel rods so as to define a number of elongated channels extending between the top and bottom nozzles. A cluster assembly having a cluster plate with a plurality of elongated rods is adapted to be removably supported on the top nozzle with its rods extending through the channels. The rods can be a plurality of guide thimbles in the case of one cluster assembly, or a plurality of oversized fuel rods in the case of another cluster assembly. The provision of cluster assemblies allows a unique scheme for loading fuel in the reactor core. Cluster assemblies containing burnt fuel can be loaded into fuel assemblies containing fresh fuel and vice versa. Also, a guide fixture mounting guide rods and a pair of comb devices mounting locking bars are utilized to depress springs within the cells of the grids in order to load fuel rods into the grid cells without scratching their exterior surfaces.

17 Claims, 19 Drawing Figures

UNIVERSAL FUEL ASSEMBLY CONSTRUCTION FOR A NUCLEAR REACTOR

CROSS REFERENCE TO RELATED APPLICATIONS

Reference is hereby made to the following copending U.S. patent applications dealing with related subject matter and assigned to the same assignee of the present invention:

1. "Fuel Rod Cluster Interchange System And Method For Nuclear Fuel Assemblies" by E. E. DeMario et al, assigned U.S. Ser. No. 716,282 and filed Mar. 26, 1985.

2. "Apparatus And Method For Loading Fuel Rods Into Grids Of A Fuel Assembly" by E. E. DeMario et al, assigned U.S. Ser. No. 717,263 and filed Mar. 28, 1985, now U.S. Pat. No. 4,651,403.

BACKGROUND OF THE INVENTION

1. Field of the Invention

The present invention relates generally to nuclear reactors and, more particularly, is concerned with a universal construction for a fuel assembly which allows greater flexibility in tailoring the fuel content thereof to the particular location of the assembly in the core of the reactor and provides for substantially total repairability of its component parts.

2. Description of the Prior Art

A typical pressurized water nuclear reactor contains a large number of fuel assemblies in its core. Each fuel assembly is substantially identical to the next except for the fuel enrichment of the individual assembly. In order to optimize the fuel burnup and smooth the radial neutron flux profile across the reactor core, historically a zoned enrichment pattern has been used. Particularly, fuel contained in assemblies located in regions nearer to the periphery of the core is somewhat more enriched than fuel contained in assemblies located in regions nearer to the center of the core. After a given core cycle, such as a year, fuel assemblies in a higher enrichment core region are shuffled into a lower enrichment region, while new fuel assemblies are added to the highest enrichment region and depleted or burned out assemblies are removed from the lowest enrichment region.

Notwithstanding their variation in fuel enrichment, all of the fuel assemblies in the reactor core have the same construction. Basically, each fuel assembly is composed of a bottom nozzle, a top nozzle, an instrumentation tube and pluralities of guide thimbles, fuel rods and grids. For instance, in one exemplary fuel assembly, the fuel rods are arranged in a square 17 by 17 array with 17 rod locations per side. Of the total possible 289 rod locations per assembly, 264 locations contain fuel rods. In addition to the single bottom nozzle, top nozzle and instrumentation tube, there are 24 guide thimbles and 8 grids.

The structural skeleton of the fuel assembly is composed of the bottom and top nozzles and the plurality of guide thimbles which extend vertically between the bottom and top nozzles and rigidly interconnect them. In addition to their shared function of providing the fuel assembly with a rigid skeleton, each one serves other functions. The bottom nozzle directs the distribution of upward coolant flow to the fuel assembly. The guide thimbles provide channels through the fuel assembly for insertion of control-type rods therein. The top nozzle provides a partial support platform for the spider assembly mounting the respective control rods. The top nozzle also has openings which permit upward flow of coolant through it. Also, the bottom and top nozzles respectively act to prevent either downward or upward ejection of a fuel rod from the fuel assembly.

The grids and fuel rods are not structural parts of the fuel assembly but instead are respectively supported directly and indirectly by the guide thimbles. The grids are attached in axially spaced positions along the guide thimbles such that the multiplicity of cells defined by interleaved straps of the respective grids are disposed in vertical alignment. The fuel rods are supported in an organized and transversely spaced array in the vertically aligned cells of the transverse grids by springs and dimples on the straps which extend into the cells. Each fuel rod contains nuclear fuel pellets and the opposite ends of the rod being closed by upper and lower end plugs are spaced below the top nozzle and above the bottom nozzle. The fuel pellets composed of fissile material are responsible for creating the reactive power of the reactor which is transferred in the form of heat energy to coolant flowing upwardly throughthe fuel assembly.

The guide thimbles are larger in diameter than the fuel rods and, as mentioned above, provide channels adapted to accommodate various types of control rods used in controlling the reactivity of the nuclear fuel. A more detailed description of this typical fuel assembly and the types of rods insertable in the guide thimbles thereof may be gained from U.S. Pat. No. 4,432,934 to Robert K. Gjertsen et al, which patent is assigned to the assignee of the present invention. While the guide thimbles accommodate various types of control rods, fuel rods cannot be placed in them when they are not being otherwise used since the fuel rods would overheat due to lack of enough remaining space within the guide thimble to accommodate sufficient coolant to carry the heat away.

Thus, the conventional fuel assembly has a significant number of its rod locations, approaching ten percent in the example above, dedicated to nonfuel use. Even more, since not all fuel assemblies in the reactor core require control rods (about two-thirds of the fuel assemblies in a typical core do not), nonfuel rod locations in many regions of the core go unused which results in reduced power output, increased fuel cycle costs, reduced fuel assembly life and a suboptimum fuel loading configuration. Also, while the interconnections provided by the guide thimbles provide a rigid skeleton of high structural integrity, the large number of thimbles increases the difficulty of top nozzle removal and remounting in carrying out fuel assembly reconstitution.

Consequently, a need exists for a fresh approach to fuel assembly design which would avoid or reduce some of the limitations and shortcomings inherent in the conventional fuel assembly construction described above and enhance its adaptability without sacrificing its structural integrity.

SUMMARY OF THE INVENTION

The preferred embodiment of the fuel assembly, as described herein, includes several improved features which meet the aforementioned needs. While the improved features are particularly suited for working together to provide a more universal fuel assembly construction adapted to be tailored to various operating conditions found in different regions of the reactor core, it is readily apparent that some of such features may be incorporated either singly or together in this or other fuel assembly constructions. Some of the several improved features comprise inventions claimed in other copending applications, cross-referenced above; however, all of the improved features are illustrated and described herein for facilitating a complete and thorough understanding of those of the features comprising the present invention.

The present invention relates to those features incorporated into the fuel assembly for facilitating the total repairability of the fuel assembly. The skeletal structure of the fuel assembly is composed of parts which can be disassembled easily. Specifically, the main structural support of the fuel assembly is provided by four corner posts which are detachable from the top and bottom nozzle. This capability ensures that damaged fuel rods and grids can be replaced so that no fuel assemblies need be discarded prematurely. When the fuel of the assembly is finally spent, complete disassembly of the fuel assembly allows compact storage in a spent fuel pit. Also, since the guide thimbles are no longer structural members, the present invention facilitates their attachment to a removable plate which provide the ability to replace unoccupied guide thimbles with fuel rods and alternative devices, also being attached to a removable plate, when the fuel assembly is not at a control rod location in the reactor core. Such replacement can be used to reduce heat flux and Kw/ft in the core, reduce fule cycle costs, extend the life of burned fuel assemblies, optimize loading patterns giving peaking factor reduction, adjust the cycle length late in analysis and increase the capability for longer cycles.

Accordingly, the present invention is directed to an universal fuel assembly, comprising: (a) an upper end structure; (b) a lower end structure; (c) a plurality of elongated members extending longitudinally between and rigidly interconnecting the upper and lower end structures, the upper and lower end structures and elongated members together forming a rigid structural skeleton of the fuel assembly; (d) a plurality of transverse grids being supported on the elongated members at axially spaced locations therealong between the upper and lower end structures; (e) a plurality of fuel rods extending through and being supported by the grids between the upper and lower end structures so as to extend in generally side-by-side spaced relation to one another and to the elongated members, certain groups of the fuel rods in the plurality thereof being spaced apart laterally from one another by a greater distance than the rest of the fuel rods so as to define a number of elongated channels extending between the upper and lower end structures; and (f) a cluster assembly having a plurality of elongated rods; (g) the upper end structure being adapted to removably support the cluster assembly such that its plurality of elongated rods extend from the upper end structure through the elongated channels toward the lower end structure.

More particularly, the lower end structure is adapted to removably support the elongated rods of the cluster assembly at lower ends thereof. Further, the upper end structure includes a transverse plate having a plurality of openings therein in a pattern matched with that of the plurality of elongated channels. The cluster assembly includes a cluster plate which mounts the plurality of elongated rods at upper ends thereof with the cluster plate being supported upon the transverse plate in an installed position and the plurality of elongated rods of the cluster assembly extending through the openings of the transverse plate.

Still further, the elongated members are posts, preferably four in number, with upper and lower ends respectively releasably connecting the upper and lower end structures at corresponding corner regions thereof. The posts at their upper ends are releasably fastened to the transverse plate of the upper end structure at spaced apart corner locations thereon between which the cluster plate rests in its installed position on the transverse plate. Furthermore, at least some of the elongated rods of said cluster assembly are guide thimbles, while one of the elongated rods is an instrumentation tube. In another cluster assembly, at least some of the elongated rods are fuel rods which are larger in size than the other fuel rods ordinarily found in the fuel assembly.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following descriptions, like reference characters designate like or corresponding parts throughout the several views of the drawings. Also, in the following description, it is to be understood that such terms as "forward", "rearward", "left", "right", "upwardly", "downwardly", and the like, are words of convenience and are not to be construed as limiting terms.

UNIVERSAL FUEL ASSEMBLY CONSTRUCTION

Figure 1:
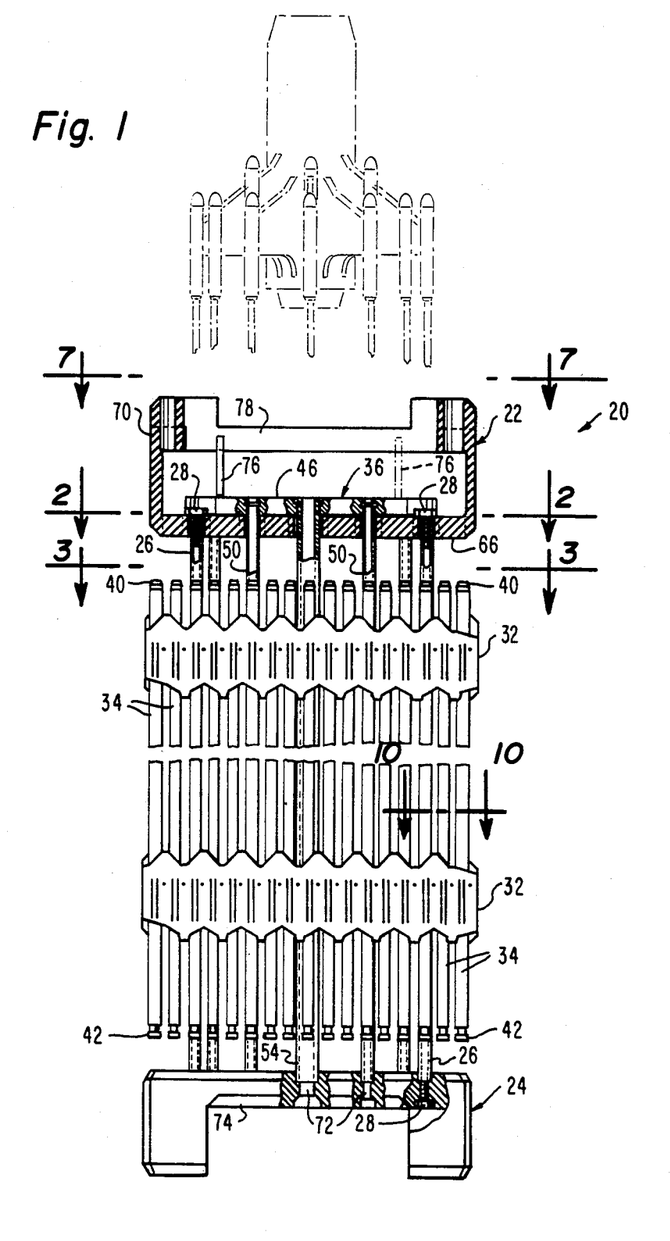
FIG. 1 is an elevational view, partly in section, of a nuclear reactor fuel assembly having an universal construction in accordance with the principles of the present invention and embodying the improved features of the inventions claimed in the applications cross-referenced above. Also, illustrated in FIG. 1 is a conventional control rod spider assembly which can be utilized with the universal fuel assembly construction and is shown in phantom outline above the fuel assembly, one feature of the universal fuel assembly construction in the form of a cluster assembly having a cluster plate supporting several guide thimbles and an instrumentation tube from above the adapter plate of the top nozzle, and another feature of the universal fuel assembly construction in the form of two of the four corner posts which constitute the vertical structural members of the assembly skeleton and which rigidly interconnect the top and bottom nozzles thereof.

Referring now to the drawings, and particularly to FIG. 1, there is shown an elevational view of a fuel assembly, having a universal construction comprising the present invention and being represented in vertically foreshortened form and generally designated by the numeral 20. The universal fuel assembly 20, designed for use in a pressurized water reactor (PWR), basically includes an upper end structure in the form of a top nozzle 22, a lower end structure in the form of a bottom nozzle 24, and a plurality of elongated members in the form of tubular posts 26 extending longitudinally between and rigidly interconnecting the top and bottom nozzles 22,24.

Figure 2:
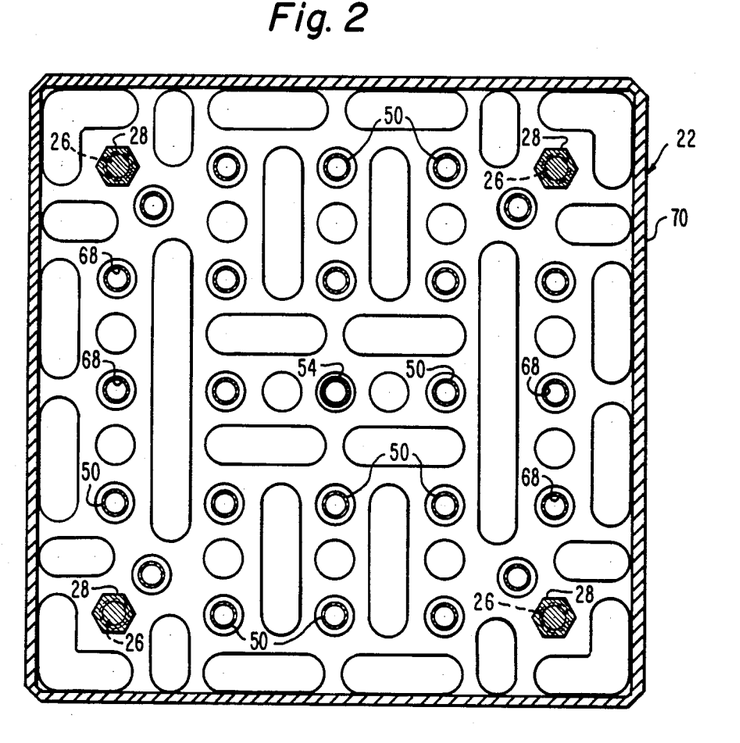
FIG. 2 is an enlarged sectional view of the top nozzle taken along line 2—2 of FIG. 1 between the cluster plate of the cluster assembly and the adapter plate of the top nozzle, showing the relative locations of the corner posts, guide thimbles and instrumentation tube in the fuel assembly as they extend through the adapter plate.
Figure 7:
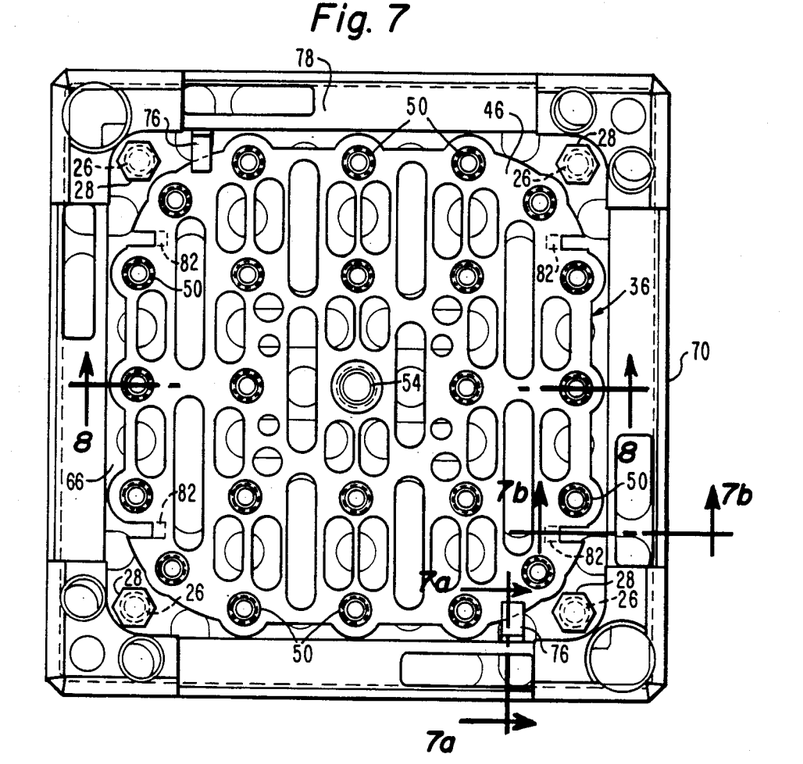
FIG. 7 is an enlarged, top plan view of the top nozzle and the cluster plate of the fuel assembly as seen along line 7—7 of FIG. 1, showing the cluster plate positioned on the adapter plate of the top nozzle and the positions of the corner posts adjacent the periphery of the cluster plate.
Figure 16:
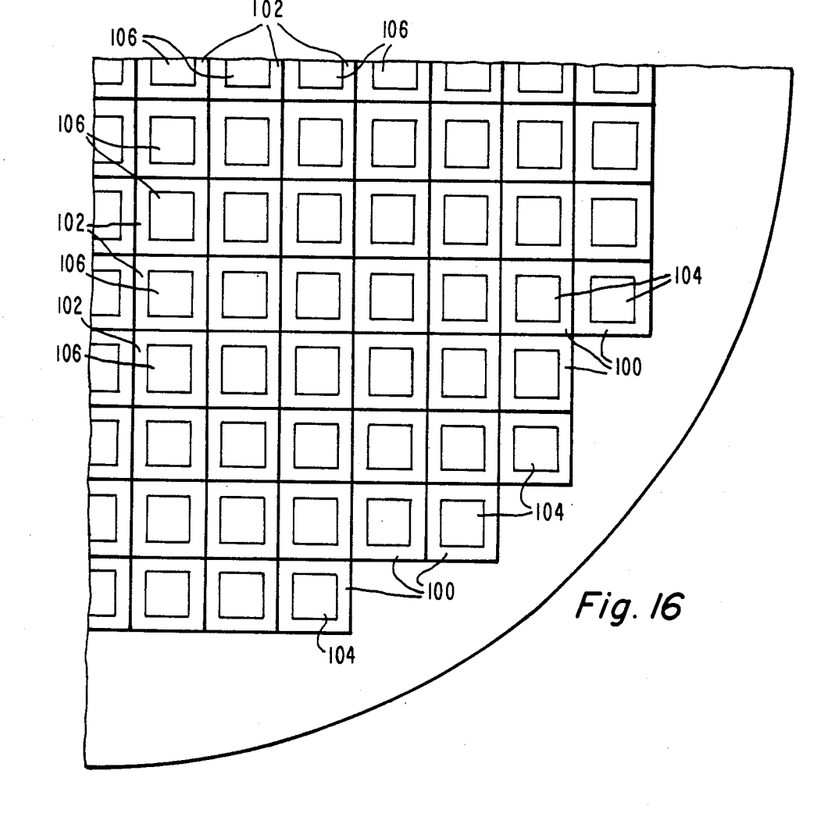
FIG. 16 is a diagrammatic representation of a quarter of the reactor core, illustrating cluster assemblies with fresh fuel installed in burned fuel assemblies and cluster assemblies with burned fuel installed in fresh fuel assemblies.

Turning to FIGS. 2 and 7 in addition to FIG. 1, it is seen that the tubular posts 26, preferably four in number, are releasably connected at their respective internally threaded upper and lower ends to respective corner regions of the top and bottom nozzles 22,24 by threaded fasteners in the form of bolts 28. In such interconnected arrangement, the top and bottom nozzles 22,24 and elongated corner posts 26 together form a rigid structural skeleton of the universal fuel assembly 20 by which the fuel assembly can be installed and removed as an integral unit into and from the core 30 (FIG. 16) of the PWR (not shown) and maintained between the upper and lower core support plates (not shown) of the reactor core 30. On the other hand, in view of such interconnected arrangement, it is readily seen that the top and bottom nozzles 22,24 and corner posts 26 are easily disassembled to facilitate total repairability not only of these structural components of the universal assembly 20 but also, and even more importantly, the nonstructural components thereof which are described below.

Figure 8:
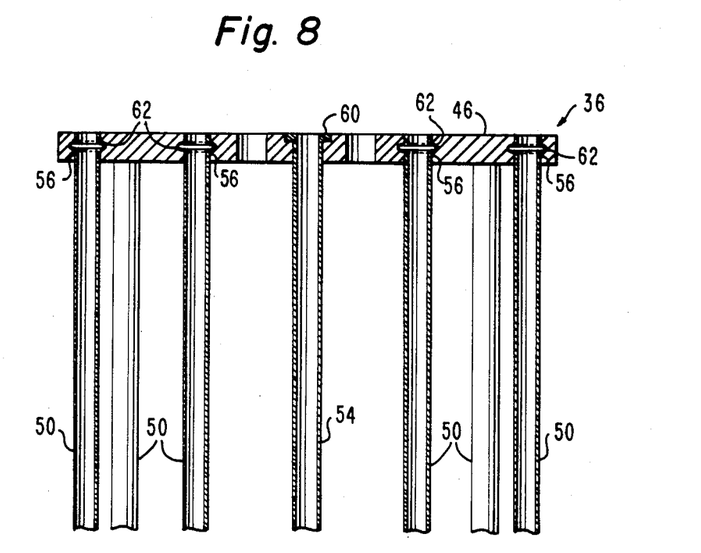
FIG. 8 is a sectional view of the cluster assembly taken along line 8—8 of FIG. 7, showing the cluster plate of the cluster assembly with four of the guide thimbles being bulge fitted to the cluster plate and also the central instrumentation tube being attached thereto.
Figure 9:
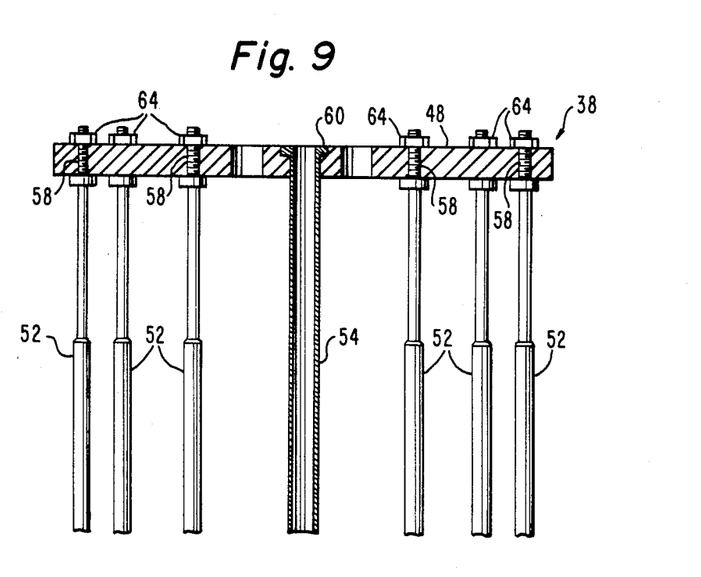
FIG. 9 is a sectional view of another cluster assembly having a cluster plate mounting a plurality of fuel rods and an instrumentation tube.

Thus, in addition to the above-described structural components, the universal fuel assembly 20 also includes several nonstructural components, namely, a plurality of transverse grids 32, a plurality of fuel rods 34, and one of several cluster assemblies 36 (FIGS. 1 and 8) or 38 (FIG. 9). While only two different cluster assemblies are depicted in the drawings and described herein, it should be understood that others are possible. The transverse grids 32 are supported on the elongated corner posts 26 in a manner to be described later at axially spaced locations therealong between the top and bottom nozzles 22,24. The fuel rods 34 extend through and are supported by the grids 32 between the top and bottom nozzles 22,24 so as to extend in generally side-by-side spaced relation to one another and to the corner posts 26. The structure of the grids 32 and the apparatus and method by which the fuel rods 34 are inserted and withdrawn from the grids without scratching their outer surfaces, which relate to the features comprising the invention claimed in the second application cross-referenced above, will be described in detail later herein.

Each fuel rod 34 includes nuclear fuel pellets therein (not shown) and the opposite ends of the rod are closed by upper and lower end plugs 40,42. The fuel pellets composed of fissile material are resonsible for creating the reactive power of the PWR. Enhancement of the reactive power generated during a given core cycle by interchanging and rearranging fresh and burnt fuel, which relate to features comprising the invention claimed in the first application cross-referenced above, will be explained in detail later herein. Liquid moderator/coolant such as water, or water containing boron, is pumped upwardly through the universal fuel assemblies 20 of the reactor core 30 in order to extract heat generated therein for the production of useful work.

Figure 3:
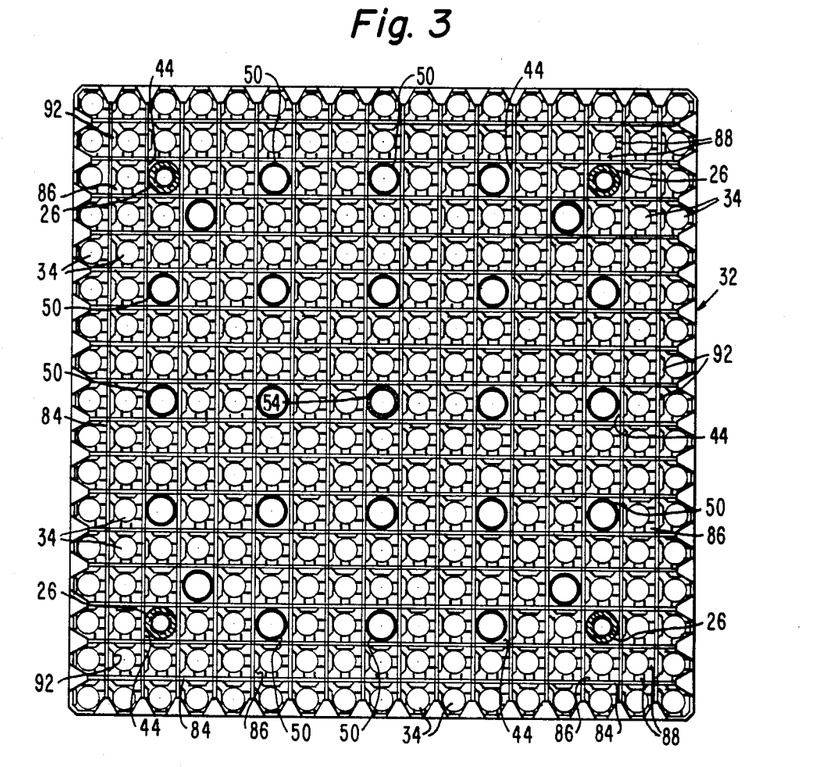
FIG. 3 is an enlarged, top plan view of the fuel rods and uppermost grid of the fuel assembly as seen along line 3—3 of FIG. 1, showing the relative locations of the fuel rods, corner posts, guide thimbles and instrumentation tube in the fuel assembly as they extend through the grid.

As can be realized by referring to FIG. 3, at specified locations within the array of fuel rods 34 of the universal fuel assembly 20, certain groups of the fuel rods 34 in the plurality thereof are spaced apart laterally from one another by a greater distance then the rest of fuel rods 34 (in effect, within each of these groups the center fuel rod is omitted) so as to define a number of elongated channels 44 extending between the top and bottom nozzles 22,24. Each cluster assembly 36,38 includes one of the cluster plate 46,48 and certain ones of a plurality of different types of elongated rods 50,52,54 which are connected at their upper ends to their respective plates and insertable through the grids 32 and the channels 44 of the improved fuel assembly 20. Thus, it is readily apparent that the elongated channels 44 are open spaces which extend longitudinally between the top and bottom nozzles 22,24 and laterally between the fuel rods 34 in the certain groups thereof. These open spaces do not have any physical structure defining them, like guide thimbles found in the skeleton of conventional fuel assemblies, so that they can accomodate therein certain ones of the different types of elongated rods 50,52,54 connected to the respective cluster plates 46,48.

Specifically, referring again to FIGS. 1, 8 and 9, each elongated rod 50 is a guide thimble, each elongated rod 52 is a fuel rod, and each elongated rod 54 is an instrumentation tube. Each of the fuel rods 52 of the cluster assembly 38 is larger in size (both length and diameter) than the fuel rods 34 supported by the grids 32. The cluster plates 46,48 have respective pluralities of openings 56,58 defined therein with each plurality being in a pattern matched with that of the plurality of channels 44. The central one of the openings 56,58 in the respective cluster plates 46,48 receives the upper end of the instrumentation tube 54 with a flange 60 formed thereon being attached, such as by welding, to the respective plate. The rest of the openings 56 in the cluster plate 46 which receive upper ends of the guide thimbles 50 each has an internal annular groove 62 therein formed in the plate 46 into which the upper end of each thimble is bulge fitted so as to provide a rigid connection between the thimble and the plate. The remainder of the openings 58 in the cluster plate 48 receive fasteners 64 formed on the upper ends of the oversized fuel rods 52 so as to provide a rigid connection between the fuel rod and the plate.

As mentioned above, each of the cluster assemblies 36,38 is adapted for insertion within the universal fuel assembly 20. More particularly, the top nozzle 22 is adapted to removably support the cluster plates 46,48 of either respective cluster assembly 36,38 such that its plurality of respective elongated rods 50,52,54 extend from the top nozzle 22 through the elongated channels 44 toward the bottom nozzle 24. The bottom nozzle 24 is adapted to removably support the elongated rods of the respective cluster assemblies 36,38 at their lower ends.

For supporting either of the cluster assemblies 36,38 and retaining it thereon, the top nozzle 22 includes a lower transverse adapter plate 66 having a plurality of holes 68 defined therein in a pattern matched with that of the elongated channels 44 and the elongated rods of the cluster assemblies, and an upstanding sidewall 70 surrounding and attached to the periphery of the adapter plate. When the cluster plates 46,48 of either of the cluster assemblies 36,38 are supported on the adapter plate 66 in an installed position, such as seen in FIGS. 1 and 7, and in solid line form in FIGS. 7a and 7b, their respective elongated rods 50,52,54 extend downwardly through the holes 68 in the adapter plate 66 and therefrom through the channels 44 toward the bottom nozzle 24. As also seen in FIG. 1, a plurality of holes 72 arranged in a corresponding pattern are formed in the transverse plate 74 of the bottom nozzle 24 which removably receive and support the lower ends of the respective elongated rods 50,52,54 of the cluster assemblies 36,38.

Figure 7A:
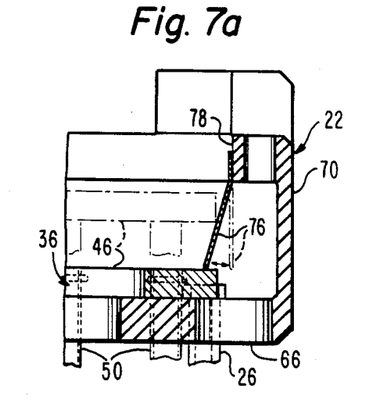
FIG. 7a is an enlarged, fragmentary sectional view of the cluster plate and top nozzle taken along line 7a—7a of FIG. 7, showing in solid line form one of two leaf springs on the top nozzle housing being engaged against the top of the cluster plate so as to retain the cluster plate on the adapter plate of the top nozzle and in dashed line form the one leaf spring being deflected to a lateral position which allows the cluster plate also being shown in phantom outline form to be moved vertically either away from or toward the adapter plate.
Figure 7B:
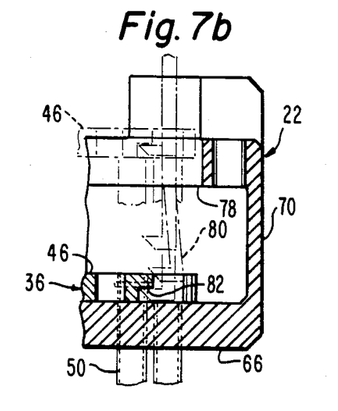
FIG. 7b is another enlarged, fragmentary sectional view of the cluster plate and top nozzle taken along line 7b—7b of FIG. 7, showing one of four undercut notches in the cluster plate in which to engage a cluster plate handling hook being shown in phantom outline form for lifting the cluster plate upwardly from the adapter plate as also shown in phantom outline form.

Latch means in the form of a pair of leaf springs 76 are mounted to an inwardly-directed upper flange 78 on the upstanding sidewall 70 of the top nozzle 22 adjacent a pair of diagonal corners thereof for retaining the respective one of the cluster plates 46,48 of the corresponding one of the cluster assemblies 36,38 in its installed position on the adapter plate 66. For example, as seen in FIGS. 1, 7 and 7a, the leaf spring 76 normally assumes a locking position in which it extends downwardly toward and into engagement with the upper surface of cluster plate 46. By using a suitable tool (not shown), the leaf spring 76 can be deflected laterally to an unlocking position, as seen in phantom outline form in FIG. 7a, in which the spring will no longer engage the upper surface of the cluster plate 46. In the latter position, a suitable tool (not shown) having a series of hooks 80 can be manipulated so as to bring the hooks into engagement with a series of undercut notches 82, such as four in number, defined near opposing diagonal corners of the cluster plate 46 such that upon lifting the tool the plate 46 can be lifted upwardly from its installed position on the adapter plate 66, as shown in phantom outline form in FIG. 7b.

In FIG. 2, the corner locations of the upper ends of the posts 26 as represented by the bolts 28 which connect with the adapter plate 66 are clearly seen, while in FIG. 7 the locations of the posts 26 as again represented by the bolts 28 in the corner regions of the adapter plate 66 just beyond the perimeter of the cluster plate 46 when in its installed position on the adapter plate is clearly illustrated. In both FIGS. 2 and 7, one can observe the respective coolant flow openings (the remaining openings of various shapes which are not occupied by any of the rods 50,54) in both the adapter plate 66 and the cluster plate 46 and the general alignment between the flow openings when the cluster plate 46 is installed on the adapter plate.

Turning now to FIGS. 3 to 6, one can readily observe that each of the grids 32, with a representative one being shown in these figures, is composed of a plurality of interleaved straps 84 arranged in an egg-crate configuration so as to define a plurality of hollow cells 86. while there are 289 cells in the illustrated embodiment with seventeen along each edge of the grid, other array sized can be used in the universal fuel assembly of the present invention and thus the locations of the posts 26 and rods 50,52 in the cells 86 of the grid 32 in FIG. 3 can vary. Each one of the cells 86 having a fuel rod 34 disposed through it contains a pair of yieldable springs 88 defined respectively on one pair of adjacent walls 90 of the cell and a pair of dimples 92 defined respectively on each wall of the other pair of adjacent walls 94. However, none of the cells 89 having one of the corner posts 26 or one of the elongated rods 50,52,54 through it contains any of such springs 88 nor dimples 92. These latter cells 86, being twenty-nine in number, are aligned with the elongated channels 44 of the fuel assembly 20 and house tubular components which are larger in diameter than the fuel rods 34.

Figure 4:
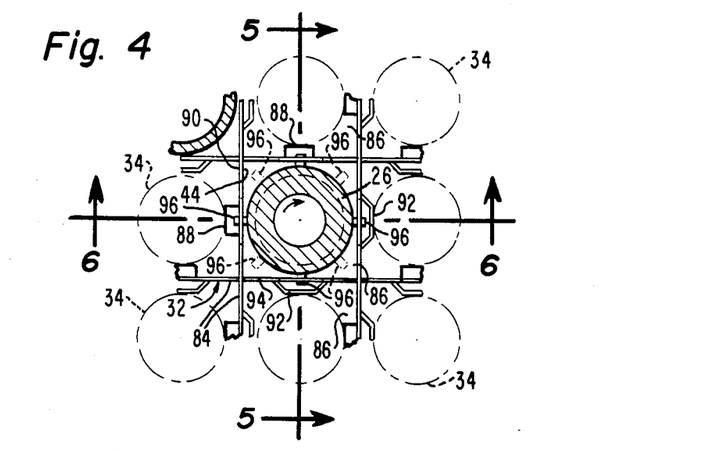
FIG. 4 is an enlarged, fragmentary plan view of the one cell of the grid of FIG. 3 which contains the lower right-hand corner post, showing in solid line form the locking positions of the tabs on the post in which the tabs interfit with dimples formed on the straps of the grid which define the one cell for connecting the grid to the post and in dashed line form the unlocking positions of the tabs relative to the grid strap dimples for disconnecting the grid from the post.
Figure 5:
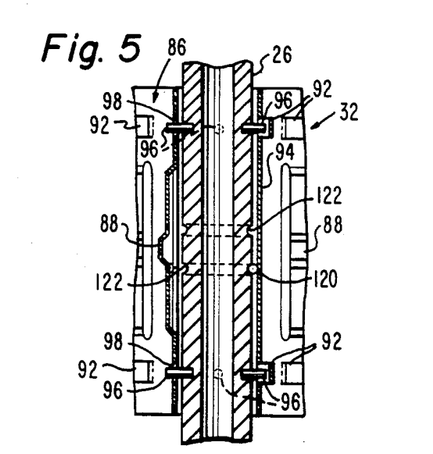
FIG. 5 is a fragmentary sectional view of the corner post and the one cell of the grid taken along line 5—5 of FIG. 4, illustrating a pair of circumferential grooves in the post with one of the grooves being shown aligned with a small hole in one of the grid straps of the cell.
Figure 6:
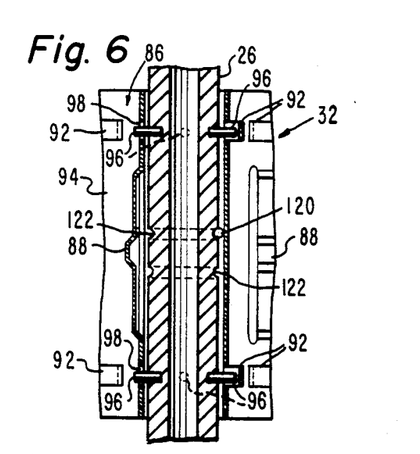
FIG. 6 is a fragmentary sectional view of the corner post and the one cell of the grid taken along line 6—6 of FIG. 4, illustrating the same pair of circumferential grooves in the post as seen in FIG. 5 but with the other of the grooves being shown aligned with another small hole in another one of the grid straps of the cell which is displaced ninety degrees from the one grid strap and hole.

While the various types of rods—the guide thimble 50, the oversized fuel rods 52 and the instrumentation tubes 54—do not require any features within the grid cells 86 to support them, the grids rely on the corner posts 26 for their support so some feature must be provided to serve this function. As depicted in FIGS. 4 to 6, each of the corner posts 26 has interfitting means in the form of four pairs of tabs 96 which project outwardly therefrom and are alignable so to extend through complementary interfitting means in the form of the dimples 92 on or holes 98 in the walls 90,94 of the respective cell 86 housing the post 26. Such dimples 92 do not extend into the respective cell 86 housing the post but into an adjacent cell, as clearly seen in FIG. 4.

In order to install the grid 32 on a corner post 26, the post is first rotated to a radial position in which its tabs 96, as shown in phantom outline form in FIG. 4, align with the corners of the cell 86 and do not interfere with any structure when the grid is moved over the post along the longitudinal axis thereof. Then the grid 32 can be retained in a stationary position on the post 26 once the tabs 96 are aligned in a circumferential plane with the dimples 92 and holes 98 by rotating the post 26 to a radial position displaced forth-five degrees from the first position in which its tabs 96, as shown in solid line form in FIG. 4 and as seen in FIGS. 5 and 6, now align and interfit in an axial plane with the dimples 92 and holes 98 of the grid walls.

In view of the releasable fastening of the upper and lower ends of the corner posts 26 to the top and bottom nozzles 22,24 as described earlier, the manner in which the posts 26 removably support the grids 32 as just described, and the releasable support of a given one of the cluster assemblies 36,38 upon the adapter plate 66 of the top nozzle 22 as also described previously, it should now be readily seen how easily the universal fuel assembly 20 can be disassembled for repairs or any other purpose.

FUEL ROD CLUSTER INTERCHANGE

As described above, the universal fuel assembly construction of the present invention facilitates the use of different cluster assemblies in different fuel assemblies. In the illustrated embodiment, two different cluster assemblies are shown. One cluster assembly 36 contains guide thimples 50 and so is used in those fuel assemblies disposed at control rod locations in the reactor core 30. However, instead of leaving the channels 44 within each fuel assembly unoccupied in the case of those fuel assemblies not disposed at control rod locations, the other cluster assembly 38 which contains oversized fuel rods 52 can be utilized.

Not only can cluster assemblies 38 containing the oversized fuel rods 52 be used at noncontrol rod locations of the core 30, in accordance with other improved features constituting the invention of the first application cross-referenced above, the concentration of the fuel used in one given cluster assembly 38 as compared with another can be different. Specifically, as viewed in FIG. 16, there is depicted a first plurality of fuel assemblies 100 which each contains an array of fresh fuel, that being the fuel contained in the normal fuel rods, such as the fuel rods 34 supported by the grids 32 in the universal fuel assembly 20 of FIG. 1. Also, in a second plurality of fuel assemblies 102 each fuel assembly contains an array of burnt fuel. Again, the burnt fuel is contained in the normal fuel rods, such as the rods 34 in the fuel assembly 20 of FIG. 1. Parenthetically, each of the fuel assemblies 100,102 in the pluralities thereof have the universal construction of the present invention. Now, the use of fuel rod cluster assemblies which are readily removable from the top nozzles of the fuel assemblies facilitates reshuffling of cluster assemblies at refueling of the reactor core 30. Thus, cluster assemblies 104 which contain burnt fuel can be relocated from fuel assemblies 102 which also contain burnt fuel to the fuel assebies 100 with fresh fuel. Similarly, cluster assemblies 106 which have fresh fuel can be installed into fuel assemblies 102 which contain burnt fuel.

Therefore, instead of the ordinary practice of loading a fuel assembly with all fresh fuel rods or with all burnt fuel rods into the reactor core, a new fuel loading scheme is now made feasible, such being, using a cluster assembly with fresh fuel in a burned fuel assembly and using a cluster assembly with burned fuel in a fresh fuel assembly. Increased productivity results from this new fuel loading scheme in terms of a reduction in fuel cycle costs, an extension of burned fuel assembly life and increased capacity for longer cycles.

APPARATUS FOR LOADING FUEL RODS INTO GRIDS

In the normal loading of one of the plurality of fuel rods 34 into the cell 86 of the grid 32, the springs 88 and dimples 92 on the walls 90,94 of the cell rub against the fuel rod surface and frequently cause scratching thereof. Not only is the external appearance of the fuel rod 34 adversely affected, more importantly accelerated corrosion is likely to occur at the scratch site and debris formed by material from the scratch is released into the coolant flow through the fuel assembly 20.

In accordance with other improved features constituting the invention of the second application cross-referenced above and depicted in FIGS. 10 to 15 and 17, the yieldable springs 88 in the grids 32 of the universal fuel assembly 20 are depressed to disengaged positions prior to loading of the fuel rods 34 into the grids. With the springs 88 held depressed, there is sufficient clearance for the fuel rods 34 to enter the cells 86 without contacting the undepressed dimples 92 which extend within the cells.

Figure 10:
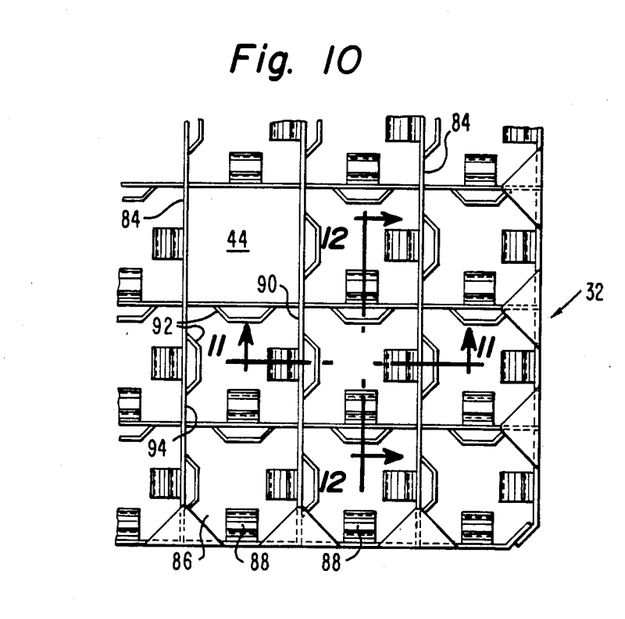
FIG. 10 is an enlarged, fragmentary top plan view of the lowermost grid of the fuel assembly as seen along line 10—10 of FIG. 1 with the fuel rods, guide thimbles and corner post being omitted to better show the springs and dimples on the straps making up the grid; however, for purposes of comparison, this fragmentary portion of the lowermost grid is identical to the lower right hand portion of the uppermost grid as seen on a reduced scale in FIG. 3 wherein the fuel rods, guide thimbles and one corner post are also illustrated.
Figure 11:
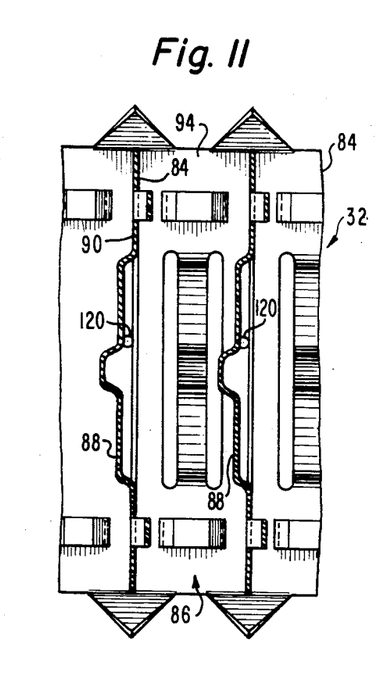
FIG. 11 is a fragmentary sectional view of the grid taken along line 11—11 of FIG. 10, showing two of the small holes which are adapted to receive two of the spring locking bars of one comb, being seen in FIG. 13, for holding the springs on the grid straps in disengaged positions to allow sufficient clearance for installation of fuel rods into the cells of the grid without contacting the springs and dimples on the straps defining the cells.
Figure 12:
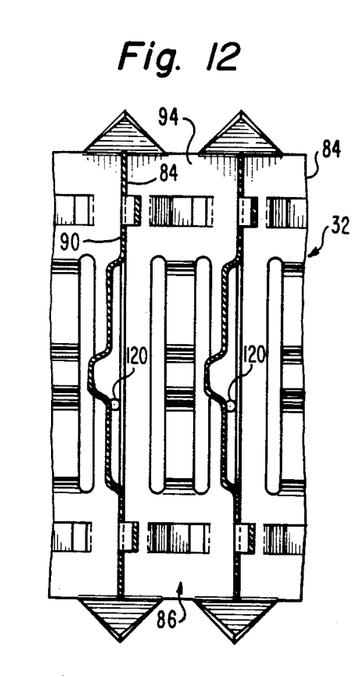
FIG. 12 is another fragmentary sectional view of the grid taken along line 12—12 of FIG. 10, showing two other small holes in grid straps of the same cells displaced ninety degrees from those of FIG. 11, which can receive two of the spring locking bars of another comb, being also seen in FIG. 13, aligned ninety degrees from the one comb.
Figure 13:
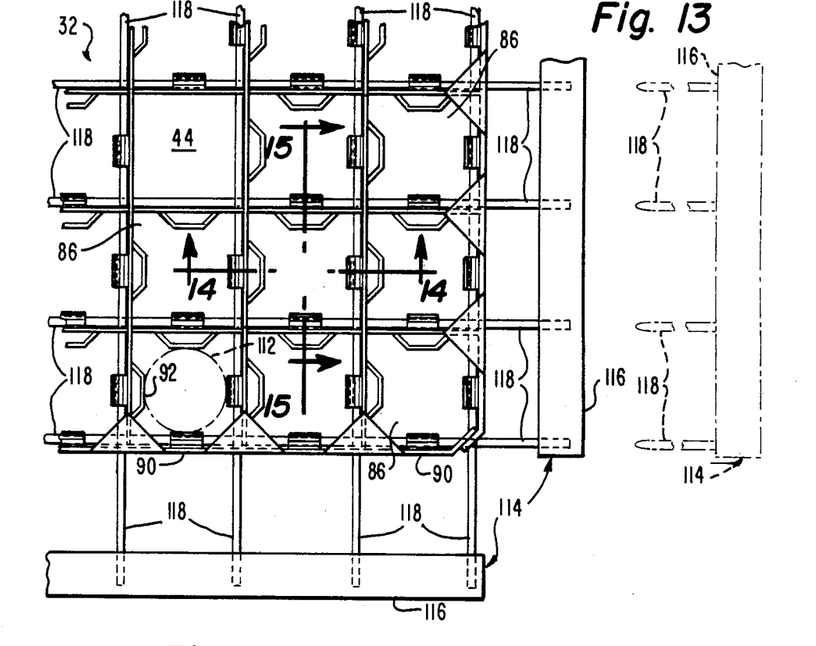
FIG. 13 is a fragmentary, top plan view of the grid similar to that of FIG. 10, but showing the spring locking bars of the combs, in fragmentary form, inserted into the respective holes in the grid straps so as to hold the springs in disengaged positions after the springs have been placed in such disengaged positions by guide rods, being shown in phantom outline form disposed within the cells formed by the grid straps.
Figure 14:
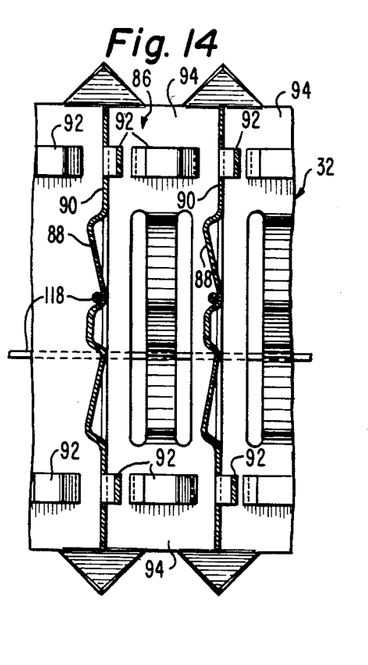
FIG. 14 is a fragmentary sectional view of the grid taken along line 14—14 of FIG. 13 and being similar to FIG. 11, but now showing the spring locking bars inserted through the small holes and holding the springs in their disengaged positions.
Figure 15:
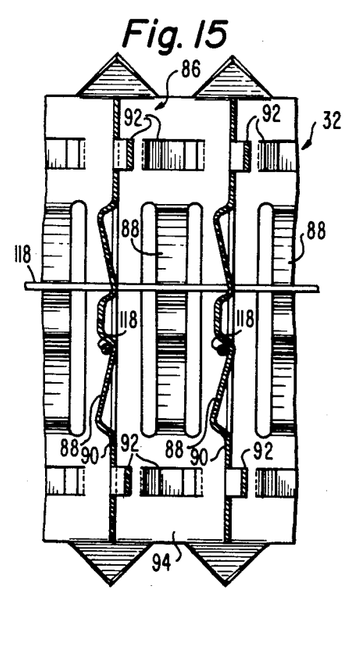
FIG. 15 is another fragmentary sectional view of the grid taken along line 15—15 of FIG. 13 and being similar to FIG. 12, but now showing the spring locking bars inserted through the small holes and holding the springs in their disengaged positions.
Figure 17:
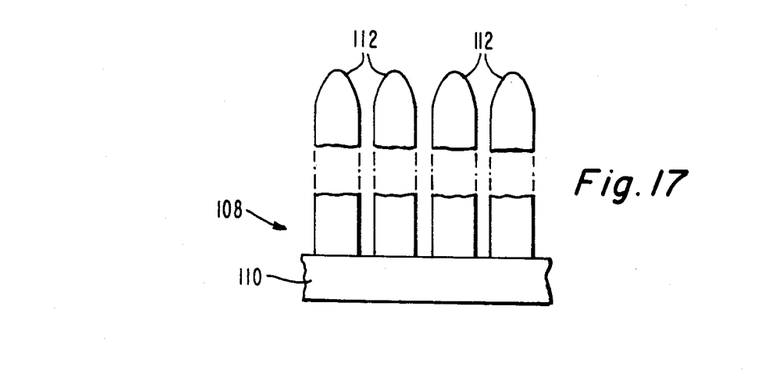
FIG. 17 is a fragmentary elevational view of the guide fixture having guide rods for deflecting the springs in the cells of the grids to their disengaged positions.

For initially depressing the yieldable springs 88 from their engaged positions, such as seen in FIGS. 10 to 12, to their disengaged positions, as seen in FIGS. 13 to 15, a guide fixture, generally indicated by 108 in FIG. 17, is used. The guide fixture 108 has a base 110 and a plurality of guide rods 112 supported thereon such that, upon movement of the grid 32 relative to the base 110, the guide rods 112 will enter the grid cells 86 concurrently and deflect or depress the springs 88 from their engaged to disengaged positions.

For retaining the yieldable springs 88 at their disengaged positions, as seen in FIGS. 13 to 15, a pair of comb devices, generally indicated by 114 in FIG. 13, are used. Each comb device 114 has a handle 116 and a plurality of spring locking bars 118 mounted thereon such that, upon movement of the handle 116 relative to the grid 32 prior to withdrawal of the guide rods 112, the locking bars 118 will enter the grid cells 86 concurrently and assume locking positions with respect to the respective springs 88 in which the latter will be held in their disengaged positions upon withdrawal of the guide rods 112. Then, after withdrawal of the guide rods 112, the fuel rods 34 can be inserted into the grid cells 86 without engaging either the depressed springs 88 or undepressed dimples 92. Once the fuel rods 34 have been inserted, the comb device 114 are moved so as to remove the locking bars 118, allowing the springs 88 to return to their normal undeflected or engaged positions. In doing so, the springs 88 contact and force the fuel rods 34 against the dimples 92 so as to hold the fuel rods 34 therebetween, retaining them in relatively stationary positions within the grid cells 86.

In both the case of the guide fixture 108 and the comb devices 114, the direction of movement of their respective guide rods 112 and locking bars 118 with respect to the grid cells 86 in linear, although the respective paths of movement thereof are generally orthogonal relative to, and offset vertically from, one another. Specifically, the guide rods 112 move parallel to the direction of an axis through each cell 86, whereas the locking bars 118 move transversely to such an axis.

In order for the locking bars 118 to move through the cells 86 in such manner, the adjacent pair of cell walls 90 of the interleaved straps 84 from which the springs 88 are formed have a plurality of holes 120 formed therein near the corners thereof which provide communication between adjacent ones of the cells. The cells 86 as seen in FIGS. 2, 10 and 13 can be viewed as being aligned in rows and columns. From such perspective, the springs 88 are also aligned in respective rows and columns as are the holes 120 defined in the cell walls 90. When the springs 88 in the rows and columns thereof are depressed in their disengaged positions by the guide rods 112, the holes 120 in the corresponding rows and columns thereof are aligned with the springs 88 so as to define paths in corresponding rows and columns for insertion of the locking bars 118 of the pair of the comb devices 114. In such manner, the springs 88 of each pair within each cell 86 are held at their disengaged positions.

It should be mentioned that the fuel rods 34 are ordinarily loaded into the respective grids 32 prior to installation of the corner posts 26 or cluster assemblies 36,38. However, as seen in FIGS. 5 and 6, annular grooves 122 are provided in the posts 26 to allow insertion of the locking bars 118 through the cells 86 containing the posts 26 should the latter already be installed in the grids 32.

It is thought that the invention and many of its attendant advantages will be understood from the foregoing description and it will be apparent that various changes may be made in the form, construction and arrangement thereof without deparing from the spirit and scope of the invention or sacrificing all of its material advantages, the form hereinbefore described being merely a preferred or exemplary embodiment thereof.

We claim:

1. A fuel assembly, comprising in combination:
    (a) a rigid fuel assembly skeleton defined by
        (i) an upper end structure having a plurality of openings defined therein;
        (ii) a lower end structure;
        (iii) a purality of elongated nonfuel, nonguide thimble, structural members extending longitudinally between and rigidly interconnecting said upper and lower end structures;
    (b) a plurality of transverse grids being supported on said elongated structural members of said fuel assembly skeleton at axially spaced locations therealong between said upper and lower end structures thereof;
    (c) a plurality of fuel rods extending through and being supported by said grids between said upper and lower end structures of said fuel assembly skeleton so as to extend in generally side-by-side spaced relation to one another and to said elongated nonfuel, structural members of said fuel assembly skeleton, certain groups of said fuel rods in said plurality thereof being spaced apart laterally from one another by a greater distance than the rest of said fuel rods so as to define a plurality of elongated channels extending through said grids and between said upper and lower end structures of said fuel assembly skeleton, said elongated channels thereby being in the form of open spaces extending laterally between said fuel rods of said certain groups thereof and longitudinally between said upper and lower end structures of said fuel assembly skeleton wherein said open spaces are not defined by any physical structure other than said end structures of said fuel assembly skeleton, said grids and said fuel rods of said certain groups thereof, said plurality of elongated channels being in a pattern which matches that of said plurality of openings in said upper end structure of said fuel assembly skeleton; and (d) a cluster assembly removably supportable on said fuel assembly skeleton and having a plurality of elongated hollow guide thimbles, said guide thimbles of said cluster assembly extending from said upper end structure of said fuel assembly skeleton through said openings therein and through said elongated channels toward said lower end structure of said fuel assembly skeleton when said cluster assembly is removably supported by said upper end structure of said fuel assembly skeleton.

2. The fuel assembly as recited in claim 1, wherein said lower end structure removably supports said elongated guide thimbles of said cluster assembly at lower ends thereof.

3. The fuel assembly as recited in claim 1, wherein said cluster assembly includes an instrumentation tube.

4. The fuel assembly as recited in claim 1, wherein said cluster assembly also has a cluster plate which mounts said plurality of elongated guide thimbles at upper ends thereof.

5. The fuel assembly as recited in claim 4, wherein said upper end structure includes a transverse means having said plurality of openings defined therein in said pattern matched with that of said plurality of elongated channels, said cluster plate of said cluster assembly being removably supported upon said transverse means in an installed position with said plurality of elongated guide thimbles of said cluster assembly extending through said openings of said transverse means.

6. The fuel assembly as recited in claim 5, further comprising:

latch means on said upper end structure being actuatable between a first position in which said latch means engages said cluster plate for retaining it at said installed position and a second position in which said latch means is disengaged from said cluster plate for allowing it to be removed from said installed position.

7. The fuel assembly as recited in claim 6, wherein said upper end structure further includes an upstanding means attached to said transverse means adjacent said cluster plate when at its installed position thereon, said latch means being in the form of at least one leaf spring mounted to said upstanding means so as to normally assume said first position in which said spring extends downwardly toward said cluster plate into engagement therewith, said spring being deflectable laterally to said second position in which said spring extends out of engagement with said cluster plate.

8. The fuel assembly as recited in claim 6, wherein said cluster plate has means defined thereon for facilitating removal of said cluster plate from its installed position on said transverse means when said latch means is at its second position disengaged from said cluster plate.

9. The fuel assembly as recited in claim 1, wherein said elongated members are four posts releasably and rigidly interconnecting said upper and lower end structures at spaced corner regions thereof.

10. The fuel assembly as recited in claim 1, wherein said elongated members include posts and means at opposite ends thereof for releasably fastening said posts to said upper and lower end structures.

11. The fuel assembly as recited in claim 1, wherein: said upper end structure includes a transverse plate having said plurality of openings defined therein in said pattern matched with that of said plurality of elongated channels;

said cluster assembly includes a cluster plate which mounts said plurality of elongated guide thimbles at upper ends thereof, said cluster plate being removably supported upon said transverse plate in an installed position with said plurality of elongated guide thimbles of said cluster assembly extending through said openings of said transverse plate; and said elongated nonfuel structural members are posts with upper and lower ends respectively releasably connecting said upper and lower end structures at corresponding corner regions thereof, said posts at their upper ends being releasably fastened to said transverse plate of said upper end structure at spaced apart corner locations thereon between which said cluster plate rests in said installed position on said transverse plate.

12. The fuel assembly as recited in claim 1, wherein: said grids include first interfitting means thereon; and said elongated members include second interfitting means thereon, said first and second interfitting means being disposed relative to one another in an unlocking position when said each elongated member is disposed in a first axially rotated position relative to said grids for allowing relative movement between said elongated members and said grids along axes of said members to install said grids thereon and in a locking position when said each elongated member is disposed in a second axially rotated position relative to said grids for maintaining said elongated members and grids stationary relative to each other to support said grids thereon.

13. The fuel assembly as recited in claim 12, wherein said first and second interfitting means are in the form of dimples defined on said grids and tabs disposed on said elongated members.

14. A fuel assembly, comprising in combination:
(a) a rigid fuel assembly skeleton defined by
    (i) an upper end structure having a plurality of openings defined therein;
    (ii) a lower end structure;
    (iii) a plurality of elongated nonfuel, nonguide thimble, structural members extending longitudinally between and rigidly interconnecting said upper and lower end structures;
(b) a plurality of transverse grids being supported on said elongated structural members of said fuel assembly skeleton at axially spaced locations therealong between said upper and lower end structures thereof;
(c) a plurality of fuel rods extending through and being supported by said grids between said upper and lower end structures of said fuel assembly skeleton so as to extend in generally side-by-side spaced relation to one another and to said elongated nonfuel, structural members of said fuel assembly skeleton, certain groups of said fuel rods in said plurality thereof being spaced apart laterally from one another by a greater distance than the rest of said fuel rods so as to define a plurality of elongated channels extending through said grids and between said upper and lower end structures of said fuel assembly skeleton, said elongated channels thereby being in the form of open spaces extending lateally between said fuel rods of said certain groups thereof and longitudinally between said upper and lower end structures of said fuel assembly skeleton wherein said open spaces are not defined by any physical structure other than said end structures of said fuel assembly skeleton, said grids and said fuel rods of said certain groups thereof, said plurality of elongated channels being in a pattern which matches that of said plurality of openings in said upper end structure of said fuel assembly skeleton; and (d) a cluster assembly removably supportable on said fuel assembly skeleton and having a plurality of fuel rods, said fuel rods of said cluster assembly extending from said upper end structure of said fuel assembly skeleton through said openings therein and through said elongated channels toward said lower end structure of said fuel assembly skeleton when said cluster assembly is removably supported by said upper end structure of said fuel assembly skeleton.

15. The fuel assembly as recited in claim 14, wherein said fuel rods of said cluster assembly are larger in size than said fuel rods in said plurality thereof.

16. The fuel assembly as recited in claim 14, wherein said cluster assembly includes an instrumentation tube.

17. The universal fuel assembly as recited in claim 14, wherein:

said upper end structure includes a transverse plate having said plurality of openings defined therein in said pattern matched with that of said plurality of elongated channels;

said cluster assembly includes a cluster plate which mounts said plurality of fuel rods at upper ends thereof, said cluster plate being removably supported upon said transverse plate in an installed position with said plurality of fuel rods of said cluster assembly extending through said openings of said transverse plate; and said elongated nonfuel structural members are posts with upper and lower ends respectively releasably connecting said upper and lower end structures at corresponding corner regions thereof, said posts at their upper ends being releasably fastened to said transverse plate of said upper end structure at spaced apart corner locations thereon between which said cluster plate rests in said installed position on said transverse plate.

* * * * *